Dec. 24, 1929.  A. LANDINI  1,740,927
ELASTIC GLOBE MAP OF THE WORLD
Filed Feb. 4, 1929
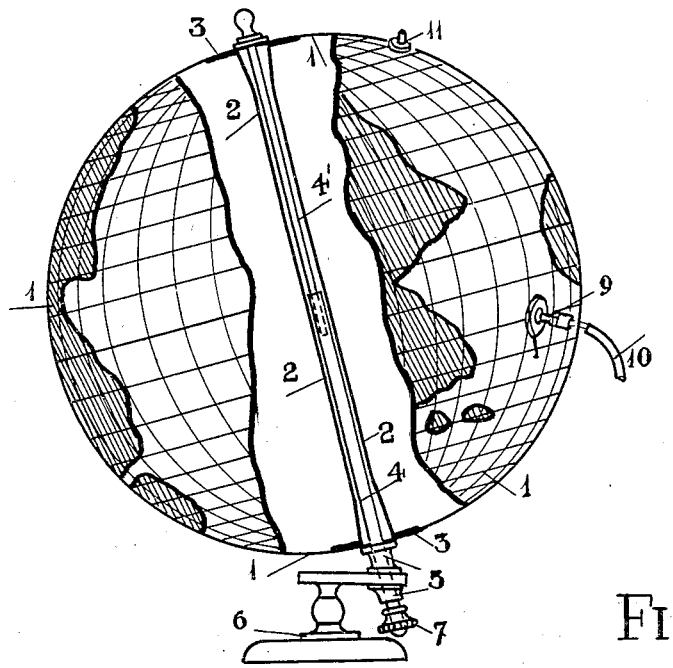
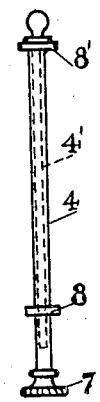
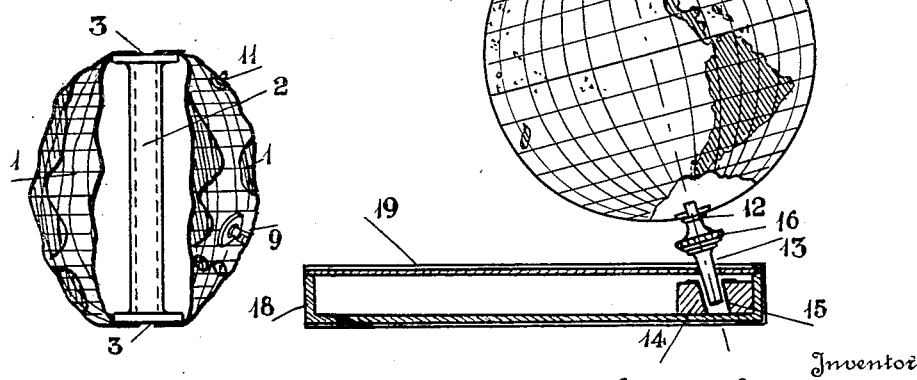

Patented Dec. 24, 1929

1,740,927

UNITED STATES PATENT OFFICE

ADELMO LANDINI, OF GENOA, ITALY

ELASTIC GLOBE MAP OF THE WORLD

Application filed February 4, 1929, Serial No. 337,383, and in Italy December 14, 1928.

This invention relates to a (terrestrial) globe map made of elastic sheet material and capable of being air-inflated when required for use and deflated and reduced to small volume when no more in use.

The advantages of having the terrestrial map drawn on a spherical surface are known, especially when compared with like views on plane maps. In geography teaching the use of a globe map facilitates giving the pupils a more exact idea of the terrestrial globe and of the true configuration of its parts, as well as a more exact idea of the different points on the earth surface, with relation to one another than the exclusive use of plane maps Furthermore advantages may be had from the use of true globe surfaces in navigation, both marine and aerial, as a means for estimating at first sight the distances and the true relative position of two or more reference points, without having the images deformed, as unavoidable with all plane map projections.

One of the drawbacks of the globe maps of the types now in use has been their cumbersomeness, owing to their construction of rigid material and especially when of large sizes, as needed for most exact determinations and the difficulty of transporting the same, owing to their volume and weight, and further the cost, which owing to their structure, must necessarily be somewhat high.

The object of the present invention is to overcome the above drawbacks by providing a globe map of sufficient exactness for the intended purposes, and if desired capable of being increased to different sizes, within certain limits, and of being reduced to a small volume when not required for use.

Further advantages of the globe according to the invention are its reduced weight, simple construction and low cost.

An embodiment of the invention is shown by way of example in the accompanying drawings in which:

Figure 1 shows a side elevation, with parts broken away, of an embodiment of a terrestrial globe according to the invention, duly inflated and ready for use on its support;

Figure 2 is a like view of the terrestrial globe shown in Figure 1, when deflated and taken away from its support, ready for rolling up and packing;

Figure 3 is a view of the axial supporting pivot, dismounted from the pedestal, the pieces being telescoped the one within the other, ready for packing, and Figure 4 is a side elevation of another embodiment.

As stated, the map of the world is drawn, either by hand or otherwise, on a sheet balloon 1 made of rubber or other suitable elastic material. Of course the map, instead of being directly drawn or printed upon the globe-balloon, may be applied thereupon in any other suitable way, as for instance on a suitable sheeting material. The map might be also a relief one and all points thereof should be exactly oriented as regards their meridians and parallels.

This presents no difficulty to the balloon or inflatable globe-makers, as will be clear to those skilled in the art. The only extra care to be taken is for the production of a balloon of material having uniform thickness, in order that the dilation may be proportional throughout the whole balloon surface. Furthermore the material employed should be of best quality in order to guarantee a long life of the article, while allowing it to be inflated or deflated and then rolled up and packed away whenever this may be thought necessary.

Along that diameter of the sphere corresponding to the terrestrial axis a tube 2 of resilient material is fitted to the poles of the balloon by means of flanges 3. The balloon envelope 1 is perforated in correspondence of the ends of tube 2 in order to allow the introduction therethrough of the pivot axle 4, 4'.

This pivot is composed of two (or several) tubular rods 4, 4' telescoping the one within the other, the pivot thus formed being capable of passing from the minimum length as shown (Figure 3) to the maximum, corresponding to the diameter of the globe in its maximum inflation, or to the length of tube 2. The lower rod section 4 is rotatably secured within a bushing 5 fitted upon a bracket integral with footpiece 6. The axis of bushing 5 is inclined to the vertical by an angle equal to the inclination of the earth axis towards the ecliptic, as customary in the usual rigid globe maps.

A nut 7, having its borders suitably milled, is screwed upon the lower end of rod section 4, and acts as stop nut and serves for turning the globe without touching the printed surface. The upper rod section 4 carries a shield plate 8' bearing against the upper end of tube 2, while the lower end thereof bears upon a like shield flange 8 integral with rod section 4 and positioned above the bushed-in section.

The balloon globe is provided with an inflation nipple 9 housing therein a suitable check valve, preferably of the type of those employed for tire inflation, and adapted to permit the globe inflation either by the mouth, or by the use of suitable air pumps, that may be connected to the nipple 9 by a flexible hose or tube 10. If desired, the balloon may carry an additional safety or vent valve 11, loaded to a predetermined maximum air pressure.

To facilitate transportation of the apparatus, the footpiece 6, axle rod 4, 4' and balloon 1 are initially dismounted, and the globe balloon is deflated as shown in Figure 2 and the rod sections telescoped, the one within the other, as shown in Figure 3. The different pieces may then be housed within a suitable carrying case as will be understood.

When the globe map is to be employed, section 4 of the rod is first mounted within sleeve or bushing 5 fitted on to the bracket member of the footpiece 6. Then the section 4' is telescoped out of section 4 and detached therefrom, and thus it is possible to fit the lower rod section 4 within tube 2 of the deflated globe and then the upper rod section 4' is again fitted within the lower one 4, through the upper part of tube 2. Now the globe balloon is ready for inflation through valve nipple 9. As the balloon swells, the yieldable tube 2 stretches longitudinally to assume the required diameter length of the inflated globe, but the yieldability of this tube is so chosen as to provide for an elongation less than the possible equatorial diameter, thus providing for the representation of the polar flattening. By the elongation of tube 2 the shield plate 8' of rod section 4' by bearing against flange 3 is forced to telescope a certain amount out of the lower section 4 and thus the pivot rod 4, 4' assumes a corresponding length.

Vent valve 11 will open whenever the inflation of globe 1 is carried on beyond a predetermined maximum or otherwise whenever for any cause (as temperature increases, etc.) the internal air pressure is in excess of the predetermined maximum pressure.

It is apparent that this embodiment attains all the ends announced, but it should be regarded only in an illustrative and not in a limiting sense, many variations being possible within the scope of the claims.

Thus for instance the invention might be advantageously embodied in the construction shown in Figure 4 of the drawings.

According to this second embodiment, the globe balloon comprises an inflatable orange-shaped envelope 1 on which the earth map is drawn, and carrying at a portion of the globe corresponding to the south pole a valved nipple 12, preferably of the type employed on pneumatic tires, fitting within a coned envelope or casing 13 projecting out of the closed cover 17 of casing 18 serving for storage of the deflated globe, as well as a foot of the globe, when inflated. Within this casing 17 a bearing block 14 is fitted, having a bore, inclined at an angle equal to the angle formed by the terrestrial axis with the line perpendicular to the ecliptic, and lined as at 15 with suitable anti-friction metal 15. A button or wheel 16 is provided on casing 13, for turning the globe as desired.

The supporting casing is so designed as to afford the desired stability to the globe, when in use.

Many other variations will be possible within the scope of the appended claims.

Having thus described my invention, I claim:

1. An inflatable globe map comprising an air-tight inflatable balloon having drawn, marked, or otherwise impressed thereon a complete world map, means for inflating such balloon globe and vent means for the escape of the excess inflation means beyond a predetermined maximum internal pressure.

2. An inflatable globe comprising a globe or depicted rubber balloon, a valved nipple for inflation of the balloon, a valved vent for relief of the excess pressure within the balloon, and means for supporting this globe balloon with its axis of revolution suitably inclined to the vertical.

3. An inflatable globe comprising a hollow spherical envelope bearing depicted thereon the world map and perforated at places corresponding to the positions of the poles, a tubular connection tightly closing the pole perforations against admission of external air; telescoping rod sections fitting within the tubular connection and having an upper and a lower stop surface bearing against the globe poles, a supporting bearing suitably inclined to the vertical and a foot piece and bracket supporting the whole device.

ADELMO LANDINI.